United States Patent

Muller et al.

[11] Patent Number: 6,128,666
[45] Date of Patent: Oct. 3, 2000

[54] DISTRIBUTED VLAN MECHANISM FOR PACKET FIELD REPLACEMENT IN A MULTI-LAYERED SWITCHED NETWORK ELEMENT USING A CONTROL FIELD/SIGNAL FOR INDICATING MODIFICATION OF A PACKET WITH A DATABASE SEARCH ENGINE

[75] Inventors: Shimon Muller, Sunnyvale; Louise Yeung, San Carlos; Ariel Hendel, Cupertino, all of Calif.

[73] Assignee: Sun Microsystems, Inc., Mountain View, Calif.

[21] Appl. No.: 08/885,000

[22] Filed: Jun. 30, 1997

[51] Int. Cl.[7] ............................. H04J 3/24; H04J 15/00; H04L 12/56; G06F 13/00
[52] U.S. Cl. ........................ 709/238; 709/203; 709/218; 709/236; 709/246; 709/239; 709/242; 709/245; 709/215; 370/401; 370/402; 370/474; 371/53
[58] Field of Search ..................... 395/200.66, 200.48, 395/200.68, 200.78, 200.69, 200.72, 200.75, 200.45, 200.33; 370/401, 402, 474; 371/53; 709/203, 218, 236, 246, 239, 242, 245, 215

[56] References Cited

U.S. PATENT DOCUMENTS

| | | | |
|---|---|---|---|
| 4,627,052 | 12/1986 | Hoare et al. | 370/88 |
| 4,652,874 | 3/1987 | Loyer | 340/825.05 |
| 4,737,953 | 4/1988 | Koch et al. | 370/94 |
| 4,807,111 | 2/1989 | Cohen et al. | 364/200 |
| 4,811,337 | 3/1989 | Hart | 370/85 |
| 4,850,042 | 7/1989 | Petronio et al. | 455/606 |
| 4,899,333 | 2/1990 | Roediger | 370/427 |
| 4,922,503 | 5/1990 | Leone | 370/402 |
| 4,933,938 | 6/1990 | Sheehy | 370/401 |
| 5,130,977 | 7/1992 | May et al. | 370/422 |
| 5,150,358 | 9/1992 | Punj et al. | 370/468 |
| 5,210,746 | 5/1993 | Maher et al. | 370/79 |

(List continued on next page.)

OTHER PUBLICATIONS

International Search Report, PCT/US98/13203, 7 pages.
International Search Report, PCT/US98/13202, 4 pages.
International Search Report, PCT/US98/13368, 5 pages.
International Search Report, PCT/US98/13200, 6 pages.
International Search Report, PCT/US98/13365, 4 pages.
International Search Report, PCT/US98/13177, 4 pages.
International Search Report, PCT/US98/13199, 5 pages.
International Search Report, PCT/US98/13015, 5 pages.

(List continued on next page.)

Primary Examiner—Zarni Maung
Assistant Examiner—William D. Thomson
Attorney, Agent, or Firm—Blakely Sokoloff Taylor & Zafman

[57] ABSTRACT

A system and method for updating packet headers using hardware that maintains the high performance of the network element. In one embodiment, the system includes an input port process (IPP) that buffers the input packet received and forwards header information to the search engine. The search engine searches a database maintained on the switch element to determine the type of the packet. In one embodiment, the type may indicate whether the packet can be routed in hardware. In another embodiment, the type may indicate whether the packet supports VLANs. The search engine sends the packet type information to the IPP along with the destination address (DA) to be updated if the packet is to be routed, or a VLAN tag if the packet has been identified to be forwarded to a particular VLAN. The IPP, during transmission of the packet to a packet memory selectively replaces the corresponding fields, e.g., DA field or VLAN tag field; the modified packet is stored in the packet memory. Associated with the packet memory are control fields containing control field information conveyed to the packet memory by the IPP. An output port process (OPP) reads the modified input packet and the control field information and selectively performs additional modifications to the modified input packet and issue control signals to the output interface (i.e., MAC). The MAC, based upon the control signals, replaces the source address field with the address of the MAC and generates a CRC that is appended to the end of the packet.

33 Claims, 8 Drawing Sheets

U.S. PATENT DOCUMENTS

| | | | |
|---|---|---|---|
| 5,220,562 | 6/1993 | Takada et al. | 370/401 |
| 5,231,633 | 7/1993 | Hluchyj et al. | 370/94.1 |
| 5,251,205 | 10/1993 | Callon et al. | 370/392 |
| 5,278,830 | 1/1994 | Kudo | 370/94.1 |
| 5,291,482 | 3/1994 | McHarg et al. | 370/413 |
| 5,293,379 | 3/1994 | Carr | 370/474 |
| 5,301,333 | 4/1994 | Lee | 395/725 |
| 5,309,437 | 5/1994 | Perlman et al. | 340/827 |
| 5,313,454 | 5/1994 | Bustini et al. | 370/13 |
| 5,343,471 | 8/1994 | Cassagnol | 370/401 |
| 5,386,413 | 1/1995 | McAuley et al. | 370/422 |
| 5,392,432 | 2/1995 | Engelstad et al. | 395/700 |
| 5,394,402 | 2/1995 | Ross | 370/402 |
| 5,396,602 | 3/1995 | Amini et al. | 395/325 |
| 5,404,538 | 4/1995 | Krappweis, Sr. | 395/725 |
| 5,410,540 | 4/1995 | Aiki et al. | 370/390 |
| 5,410,722 | 4/1995 | Cornaby | 395/800 |
| 5,420,862 | 5/1995 | Perlman | 370/85.13 |
| 5,422,838 | 6/1995 | Lin | 365/49 |
| 5,425,028 | 6/1995 | Britton et al. | 370/401 |
| 5,426,736 | 6/1995 | Guineau, III | 395/250 |
| 5,432,907 | 7/1995 | Picazo, Jr. et al. | 395/200 |
| 5,450,399 | 9/1995 | Sugita | 370/60.1 |
| 5,455,820 | 10/1995 | Yamada | 370/413 |
| 5,457,681 | 10/1995 | Gaddis et al. | 370/402 |
| 5,459,714 | 10/1995 | Lo et al. | 370/13.1 |
| 5,459,717 | 10/1995 | Mullan et al. | 370/351 |
| 5,461,611 | 10/1995 | Drake et al. | 370/54 |
| 5,461,624 | 10/1995 | Mazzola | 370/402 |
| 5,473,607 | 12/1995 | Hausman | 370/85.13 |
| 5,477,537 | 12/1995 | Dankert et al. | 370/60 |
| 5,481,540 | 1/1996 | Huang | 370/85.13 |
| 5,485,455 | 1/1996 | Dobbins et al. | 370/255 |
| 5,485,578 | 1/1996 | Sweazey | 395/200.54 |
| 5,490,139 | 2/1996 | Baker et al. | 370/401 |
| 5,490,252 | 2/1996 | Macera et al. | 395/200.79 |
| 5,500,860 | 3/1996 | Perlman et al. | 370/85.13 |
| 5,509,123 | 4/1996 | Dobbins et al. | 395/200.15 |
| 5,515,376 | 5/1996 | Murthy et al. | 340/402 |
| 5,535,202 | 7/1996 | Kondoh | 370/60.1 |
| 5,550,816 | 8/1996 | Hardwick et al. | 370/401 |
| 5,553,067 | 9/1996 | Walker et al. | 370/474 |
| 5,555,405 | 9/1996 | Griesmaer et al. | 395/600 |
| 5,561,666 | 10/1996 | Christensen et al. | 370/434 |
| 5,566,170 | 10/1996 | Bakke et al. | 370/474 |
| 5,570,365 | 10/1996 | Yodhida | 370/85.6 |
| 5,572,522 | 11/1996 | Calamvokis et al. | 370/395 |
| 5,583,981 | 12/1996 | Pleyer | 395/326 |
| 5,592,476 | 1/1997 | Calamvokis et al. | 370/390 |
| 5,594,727 | 1/1997 | Kolbenson et al. | 370/468 |
| 5,600,641 | 2/1997 | Duault et al. | 370/400 |
| 5,602,841 | 2/1997 | Lebizay et al. | 370/413 |
| 5,606,669 | 2/1997 | Bertin et al. | 395/200.15 |
| 5,608,726 | 3/1997 | Virgile | 370/401 |
| 5,610,905 | 3/1997 | Murthy et al. | 370/401 |
| 5,617,421 | 4/1997 | Chin et al. | 370/402 |
| 5,619,500 | 4/1997 | Hiekali | 370/414 |
| 5,619,661 | 4/1997 | Crews et al. | 395/299 |
| 5,633,865 | 5/1997 | Short | 370/401 |
| 5,636,371 | 6/1997 | Yu | 395/200.57 |
| 5,640,605 | 6/1997 | Johnson et al. | 395/881 |
| 5,649,109 | 7/1997 | Griesmer et al. | 395/200.17 |
| 5,651,002 | 7/1997 | Van Seters et al. | 370/401 |
| 5,675,741 | 10/1997 | Aggarwal et al. | 370/200.72 |
| 5,684,800 | 11/1997 | Dobbins et al. | 370/401 |
| 5,689,518 | 11/1997 | Galand et al. | 371/53 |
| 5,691,984 | 11/1997 | Gardner et al. | 370/401 |
| 5,706,472 | 1/1998 | Ruff et al. | 395/497.04 |
| 5,720,032 | 2/1998 | Picazo, Jr. et al. | 395/200.8 |
| 5,724,358 | 3/1998 | Headrick et al. | 370/418 |
| 5,726,977 | 3/1998 | Lee | 370/235 |
| 5,734,865 | 3/1998 | Yu | 395/500 |
| 5,740,171 | 4/1998 | Mazzola et al. | 370/401 |
| 5,740,175 | 4/1998 | Wakeman et al. | 395/200.45 |
| 5,740,375 | 4/1998 | Dunne et al. | 395/200.48 |
| 5,742,604 | 4/1998 | Edsall et al. | 370/401 |
| 5,742,760 | 4/1998 | Picazo, Jr et al. | 370/351 |
| 5,745,048 | 4/1998 | Taguchi et al. | 340/870.01 |
| 5,748,905 | 5/1998 | Hauser et al. | 395/200.79 |
| 5,751,967 | 5/1998 | Raab et al. | 395/200.72 |
| 5,751,971 | 5/1998 | Dobbins et al. | 395/200.68 |
| 5,754,540 | 5/1998 | Liu et al. | 370/315 |
| 5,754,774 | 5/1998 | Bittinger et al. | 395/200.33 |
| 5,754,801 | 5/1998 | Lambrecht et al. | 395/308 |
| 5,757,771 | 5/1998 | Li et al. | 370/235 |
| 5,757,795 | 5/1998 | Schnell | 370/392 |
| 5,761,435 | 6/1998 | Fukuda et al. | 395/200.68 |
| 5,764,634 | 6/1998 | Christensen et al. | 370/401 |
| 5,764,636 | 6/1998 | Edsall | 370/401 |
| 5,781,549 | 7/1998 | Dai | 370/398 |
| 5,784,573 | 7/1998 | Szczepanek et al. | 395/200.8 |
| 5,790,546 | 8/1998 | Dobbins et al. | 370/400 |
| 5,790,808 | 8/1998 | Seaman | 395/200.53 |
| 5,802,047 | 9/1998 | Kinoshita | 370/359 |
| 5,802,052 | 9/1998 | Venkataraman | 370/395 |

OTHER PUBLICATIONS

International Search Report, PCT/US98/13016, 4 pages.

Wang et al., "A Novel Message Switch For Highly Parallel Systems", IEEE, pp. 150–155, 1989.

Tobagi, Fast Packet Switch/Architectures For Broadband Integrated Services Digital Networks, Proceedings of the IEEE, vol. 78, Issue 1, pp. 133–167, Jan. 1990.

Fliesser et al., "Design Of A Multicast ATM Packet Switch, Electrical and Computer Engineering", 1993 Canadian Conferencem pp. 779–783, 1993.

Chang et al., An Overview Of The Pipelined Common Buffer Architecture (PCBA) For Mamory Based Packet/Cell Switching Systems, Local Computer Networks, 1994, pp. 288–297, 19$^{th}$ Conference IEEE.

Agarwal et al., "A Scalable Shared Buffer ATM Switch Architecture", VLSI, 1995 5$^{th}$ Great Lakes Symposium, IEEE, pp. 256–261, 1994.

Sabaa et al., "Implementation Of A Window–Based Scheduler In An ATM Switch", Electrical An Computer Engineering, 1995 Canadian Conference, IEEE, pp. 32–35, 1995.

International Search Report, PCT/US98/13361, 5 pages.

International Search Report, PCT/US98/13206, 5 pages.

International Search Report, PCT/US98/13364, 4 pages.

International Search Report, PCT/US98/13362, 5 pages.

Naraghi–Pour et al., A Multiple Shared Memory Switch, System Theory, 1996 Southeastern Symposium, IEEE, pp. 50–541996.

Iyengar et al., Switching Prioritized Packets, GLOBECOM '89, IEEE Global Telecommunications Conference, pp. 1181–1186, 1989.

"Foundry Products", downloaded from Website http://www.foundrynet.com/ on Jun., 19, 1997.

Anthony J. McAuley & Paul Francis, "Fast Routing Table Lookup Using CAMs", IEEE, 1993, pp. 1382–1390.

"Gigabit Ethernet", Network Strategy Report, The Burton Group, v2, May 8, 1997 40 pages.

"IP On Speed", Erica Roberts, Internet–Draft, Data Communications on the Web, Mar. 1997, 12 pages.

"Multilayer Topology", White Paper, Internet–Draft, 13 pages, downloaded from website http://wwwbaynetworks.com on Apr. 18, 1997.

6,128,666

DISTRIBUTED VLAN MECHANISM FOR PACKET FIELD REPLACEMENT IN A MULTI-LAYERED SWITCHED NETWORK ELEMENT USING A CONTROL FIELD/SIGNAL FOR INDICATING MODIFICATION OF A PACKET WITH A DATABASE SEARCH ENGINE

FIELD OF THE INVENTION

The system and method of the present invention relates to the area of packet field replacement in a packet switched network; more particularly the present invention relates to the hardware implementation of packet field replacement of packet header fields of a packet within a switch coupled to a network.

ART BACKGROUND

Local area networks (LANs) have become quite sophisticated in architecture. Originally, LANs were thought of as a single wire connecting a few computers. Today LANs are implemented in complicated configurations to enhance functionality and flexibility. In such a network, packets are transmitted from source device to destination device; in more expansive networks, this packet can travel through one or more switches and/or routers. Standards have been set to define the packet structure and layers of functionality and sophistication of a network. For example, the TCP/IP protocol stack defines four distinct multiple layers, e.g. the physical layer (layer 1), data link layer (layer 2), network layer (layer 3), transport layer (layer 4). A network device may be capable of support in one or more of the layers and refer to particular fields of the header accordingly.

Today, typical LANs utilize a combination of Layer 2 (data link layer) and Layer 3 (network layer) network devices. In order to meet the ever increasing performance demands from the network, functionality that has been traditionally performed in software and/or in separate layer 2 and layer 3 devices have migrated into one multi-layer device or switch that implements the performance critical functions in hardware.

One performance critical function is routing. Software that implements routing can impact performance. Therefore, it is desirable to implement the routing in faster hardware. However, routing requires certain header fields of an incoming packet to be modified prior to output from the device. Although perhaps straightforward to perform in software, in a hardware implementation, it is critical to minimize additional hardware while not compromising performance.

Recently, the concept of Virtual Local Area Networks (VLANs) was introduced to Layer 2. The Layer 2 header has been modified to add bits that provide VLAN capability. VLANs enable the logical partitioning of network nodes independent of physical partitioning or arrangement in the network topology. Based upon the state of the packet, VLAN bits, e.g., VLAN tags may also need to be modified. Although software-based techniques are usable, it is desirable to provide an efficient hardware approach.

SUMMARY OF THE INVENTION

A system and method for updating packet headers using hardware that provides minimal impact on performance of the network element. In one embodiment, the system includes an input port process (IPP) that buffers the input packet received and forwards header information to the search engine. The search engine searches a database maintained on the switch element to determine the type of the packet. In one embodiment, the type may indicate whether the packet can be routed in hardware. In another embodiment, the type may indicate whether the packet supports VLANs. The search engine sends the packet type information to the IPP along with the destination address (DA) to be updated if the packet is to be routed, or a VLAN tag if the packet has been identified to be forwarded to a particular VLAN. The IPP, during transmission of the packet to a packet memory selectively replaces the corresponding fields, e.g., DA field or VLAN tag field; the modified packet is stored in the packet memory. Associated with the packet memory are control fields containing control field information conveyed to the packet memory by the IPP. In one embodiment, the control field information consists of a flag to indicate that the source address needs replacement. In another embodiment, the control field information consists of flags to indicate whether the packet came in tagged, the packet came in tagged but the tag was modified or that the packet is not to be tagged.

An output port process (OPP) reads the modified input packet and the control field information, selectively performs additional modifications to the modified input packet and issues control signals to the output interface (i.e., MAC). In one embodiment, the OPP strips the last 4 bytes of the packet corresponding to the CRC and asserts control signals to the MAC to append a CRC and replace the source address. In another embodiment, depending upon the state of the three control fields, the OPP removes the VLAN tag field in the packet, strips the last 4 bytes of the packet corresponding to the CRC and issues a control signal to the MAC to append a CRC. The MAC, based upon the control signals received from the OPP, replaces the source address field with its own MAC address and generates a CRC that is appended to the end of the packet.

BRIEF DESCRIPTION OF THE DRAWINGS

The objects, features and advantages of the present invention will be apparent to one skilled in the art in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
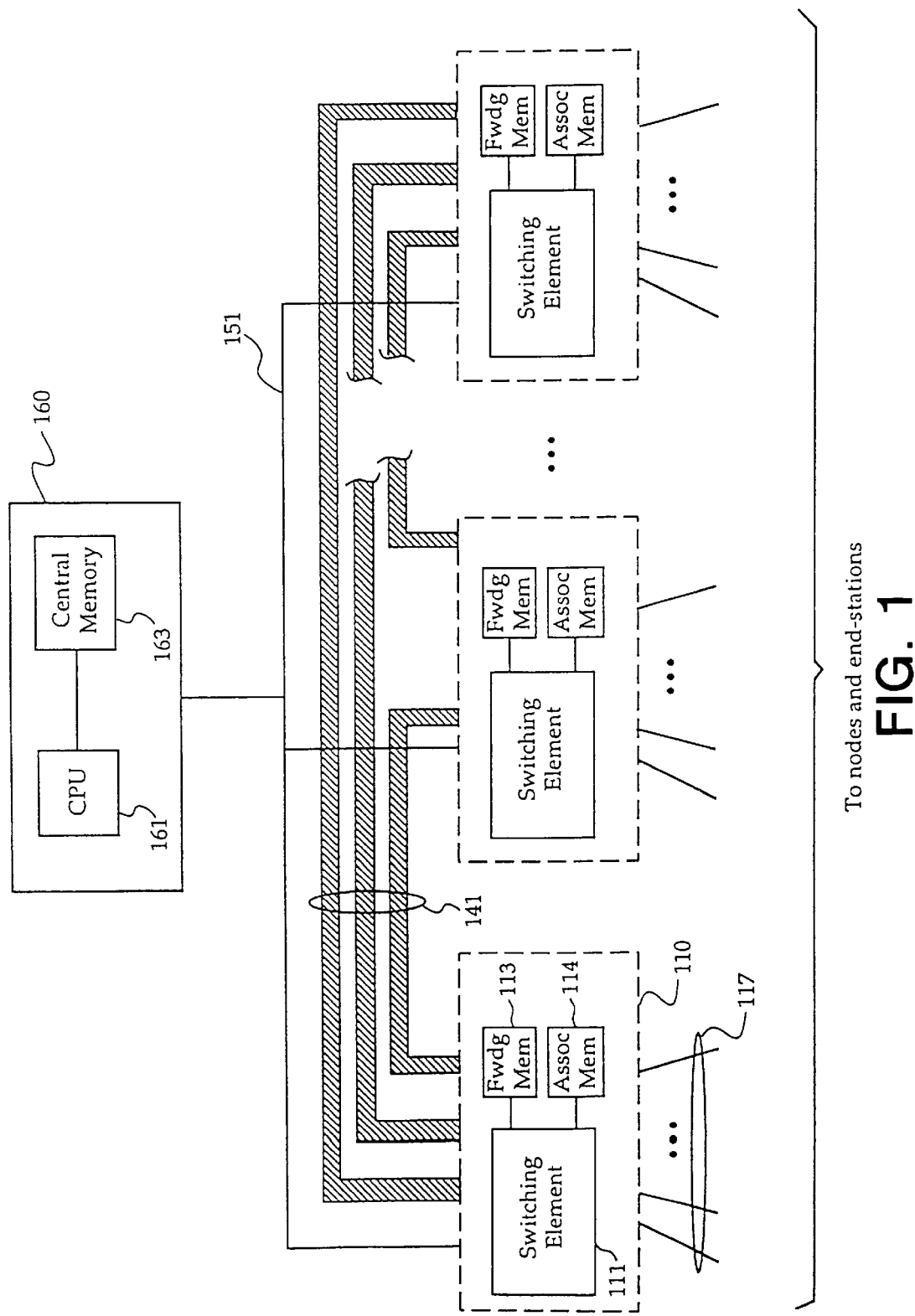
FIG. 1 is a simplified block diagram of a high speed switch which operates in accordance with the teachings of the present invention.

An overview of one embodiment of a network element that operates in accordance with the teachings of the present invention is illustrated in FIG. 1. The network element is used to interconnect a number of nodes and end-stations in a variety of different ways. In particular, an application of the multi-layer distributed network element (MLDNE) would be to route packets according to predefined routing protocols over a homogenous data link layer such as the IEEE 802.3 standard, also known as the Ethernet. Other routing protocols can also be used.

The MLDNE's distributed architecture can be configured to route message traffic in accordance with a number of known or future routing algorithms. In a preferred embodiment, the MLDNE is configured to handle message traffic using the Internet suite of protocols, and more specifically the Transmission Control Protocol (TCP) and the Internet Protocol (IP) over the Ethernet LAN standard and medium access control (MAC) data link layer. The TCP is also referred to here as a Layer 4 protocol, while the IP is referred to repeatedly as a Layer 3 protocol.

In one embodiment of the MLDNE, a network element is configured to implement packet routing functions in a distributed manner, i.e., different parts of a function are performed by different subsystems in the MLDNE, while the final result of the functions remains transparent to the external nodes and end-stations. As will be appreciated from the discussion below and the diagram in FIG. 1, the MLDNE has a scalable architecture which allows the designer to predictably increase the number of external connections by adding additional subsystems, thereby allowing greater flexibility in defining the MLDNE as a stand alone router.

As illustrated in block diagram form in FIG. 1, the MLDNE 101 contains a number of subsystems 110 that are fully meshed and interconnected using a number of internal links 141 to create a larger switch. At least one internal link couples any two subsystems. Each subsystem 110 includes a switch element 111 coupled to a forwarding memory 113 and an associated memory 114. The forwarding memory (or database) 113 stores an address table used for matching with the headers of received packets. The associated memory (or database) stores data associated with each entry in the forwarding memory that is used to identify forwarding attributes for forwarding the packets through the MLDNE. A number of external ports (not shown) having input and output capability interface the external connections 117. In one embodiment, each subsystem supports multiple Gigabit Ethernet ports, Fast Ethernet ports and Ethernet ports. Internal ports (not shown) also having input and output capability in each subsystem couple the internal links 141. Using the internal links, the MLDNE can connect multiple switching elements together to form a multigigabit switch.

The MLDNE 101 further includes a central processing system (CPS) 160 that is coupled to the individual subsystem 110 through a communication bus 151 such as the peripheral components interconnect (PCI). The CPS 160 includes a central processing unit (CPU) 161 coupled to a central memory 163. Central memory 163 includes a copy of the entries contained in the individual forwarding memories 113 of the various subsystems. The CPS has a direct control and communication interface to each subsystem 110 and provides some centralized communication and control between switch elements.

Figure 2:
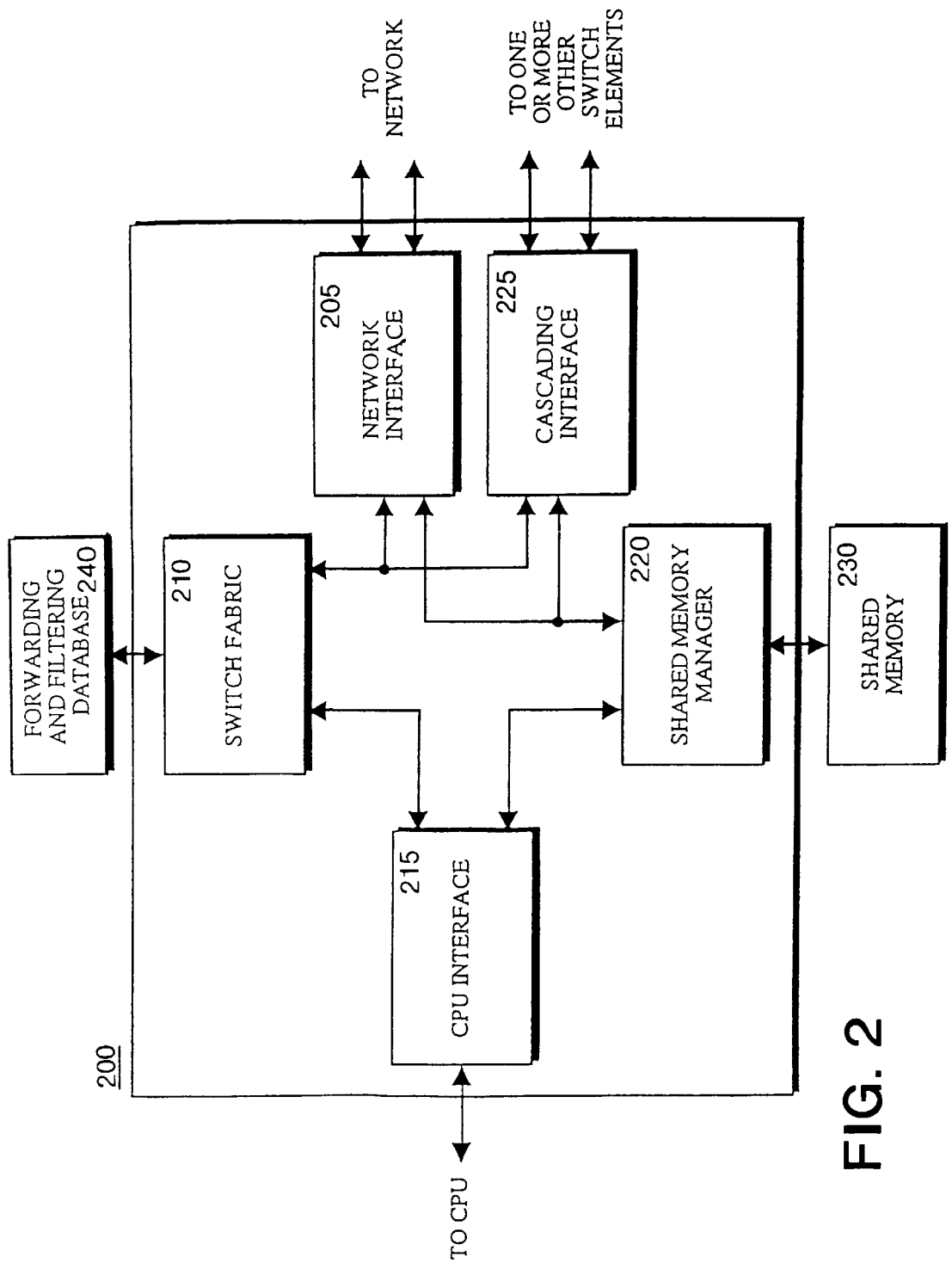
FIG. 2 is a simplified block diagram of a high speed switch element which operates in accordance with the teachings of the present invention.

FIG. 2 is a simplified block diagram illustrating an exemplary architecture of the switch element of FIG. 1. The switch element 200 depicted includes a central processing unit (CPU) interface 215, a switch fabric block 210, a network interface 205, a cascading interface 225, and a shared memory manager 220.

Ethernet packets may enter or leave the network switch element 200 through any one of the three interfaces 205, 215, or 225. In brief, the network interface 205 operates in accordance with a corresponding Ethernet protocol to receive Ethernet packets from a network (not shown) and to transmit Ethernet packets onto the network via one or more external ports (not shown). An optional cascading interface 225 may include one or more internal links (not shown) for interconnecting switching elements to create larger switches. For example, each switch element may be connected together with other switch elements in a full mesh topology to form a multi-layer switch as described above. Alternatively, a switch may comprise a single switch element 200 with or without the cascading interface 225.

The CPU (not shown) may transmit commands or packets to the network switch element 200 via the CPU interface 215. In this manner, one or more software processes running on the CPU may manage entries in an external forwarding and filtering database 240, such as adding new entries and invalidating unwanted entries. In alternative embodiments, however, the CPU may be provided with direct access to the forwarding and filtering database. In any event, for purposes of packet forwarding, the CPU port of the CPU interface 215 resembles a generic input port into the switch element 200 and may be treated as if it were simply another external network interface port. However, since access to the CPU port occurs over a bus such as a peripheral components interconnect (PCI) bus, the CPU port does not need any media access control (MAC) functionality.

Returning to the network interface 205, the two main tasks of input packet processing and output packet processing will now briefly be described. Input packet processing may be performed by one or more input ports of the network interface 205. Input packet processing includes the following: (1) receiving and verifying incoming Ethernet packets, (2) modifying packet headers when appropriate, (3) requesting buffer pointers from the shared memory manager 220 for storage of incoming packets, (4) requesting forwarding decisions from the switch fabric block 210, (5) transferring the incoming packet data to the shared memory manager 220 for temporary storage in an external shared memory 230, and (5) upon receipt of a forwarding decision, forwarding the buffer pointer(s) to the output port(s) indicated by the forwarding decision. Output packet processing may be performed by one or more output ports of the network interface 205. Output processing includes requesting packet data from the shared memory manager 220, transmitting packets onto the network, and requesting deallocation of buffer(s) after packets have been transmitted.

The network interface 205, the CPU interface 215, and the cascading interface 225 are coupled to the shared memory manager 220 and the switch fabric block 210. Preferably, critical functions such as packet forwarding and packet buffering are centralized as shown in FIG. 2. The shared memory manager 220 provides an efficient centralized interface to the external shared memory for buffering of incoming packets. The switch fabric block 210 includes a search engine and learning logic for searching and maintaining the forwarding and filtering database with the assistance of the CPU.

The centralized switch fabric block 210 includes a search engine that provides access to the forwarding and filtering database on behalf of the interfaces 205, 215, and 225. Packet header matching, Layer 2 based learning, Layer 2 and Layer 3 packet forwarding, filtering, and aging are exemplary functions that may be performed by the switch fabric block 210. Each input port is coupled with the switch fabric block 210 to receive forwarding decisions for received packets. The forwarding decision indicates the outbound port(s) (e.g., external network port or internal cascading port) upon which the corresponding packet should be transmitted. Additional information may also be included in the forwarding decision to support hardware routing such as a new MAC destination address (DA) for MAC DA replacement. Further, a priority indication may also be included in the forwarding decision to facilitate prioritization of packet traffic through the switch element 200.

In the present embodiment, Ethernet packets are centrally buffered and managed by the shared memory manager 220. The shared memory manager 220 interfaces every input port and output port and performs dynamic memory allocation and deallocation on their behalf, respectively. During input packet processing, one or more buffers are allocated in the external shared memory and an incoming packet is stored by the shared memory manager 220 responsive to commands received from the network interface 205, for example. Subsequently, during output packet processing, the shared memory manager 220 retrieves the packet from the external shared memory and deallocates buffers that are no longer in use. To assure no buffers are released until all output ports have completed transmission of the data stored therein, the shared memory manager 220 preferably also tracks buffer ownership.

Figure 3:
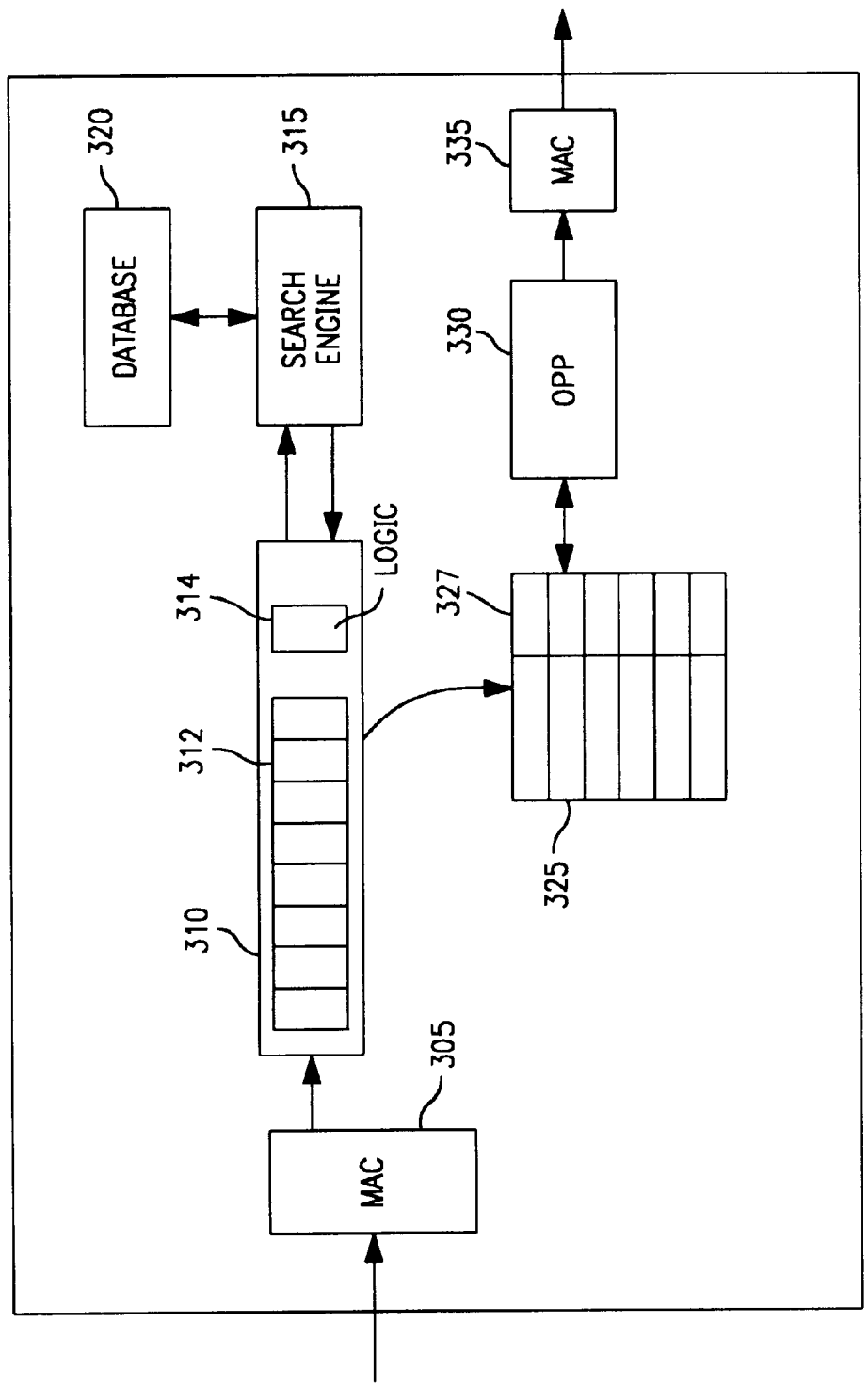
FIG. 3 is a simplified block diagram of one embodiment of the system of the present invention.

FIG. 3 is a simplified block diagram of the structure for implementing high speed field replacement in accordance with the teachings of the present invention. The following elements are used: an input Media Access Control (MAC 305), input port process (IPP) 310, search engine 315, database 320, packet memory 325, output port process (OPP) 330 and output MAC 335. As is readily apparent from the prior overview of the switching element (FIG. 2), many of the elements are multi-purpose and provide additional functionality. Thus the present structure is not only time efficient but also cost effective, adding a minimum amount of additional logic to the structure in order to support field replacement.

Furthermore, the present invention preserves end-to-end error robustness by modifying or updating header information only when necessary. For example, in prior art systems, whether implemented in hardware or software, the receive MAC is configured to always strip the CRC off the packet regardless of whether the header of the packet is modified. Thus, the transmit MAC in such prior art devices is configured to always generate the CRC. As will be explained below, the CRC is only stripped when the header is modified, if the header is not modified, the original CRC remains untouched and end-to-end error robustness is preserved.

For purposes of simplifying the present discussion, the additional functional details of the different elements not directly related to the field replacement process described therein are not discussed in detail. Furthermore, it is contemplated that the structure described herein can be applied to other switching elements having similar structures. Finally, although field replacement for VLAN packets and hardware routing is described, it is contemplated that other types of packets similarly requiring header field replacement can benefit from the teachings of the present invention.

Referring to FIG. 3, the input MAC 305 receives the input packet and directs the input packet to the IPP 310. The IPP includes a first in first out (FIFO) buffer 312 to buffer the input packet. Logic 314, which preferably includes multiplexing circuitry and the associative select logic, is also included to forward control information and also replace predetermined fields of the header as the header is transmitted out of the IPP 310 and into the packet memory 325. The IPP 310 forwards a copy of the header to the search engine 315 which searches the database 320 to determine if there is information relevant to the packet such as the type of packet, e.g., VLAN supported or whether the packet can be routed. It is contemplated that a variety of configurations of search engines and databases may be used. In one embodiment, the search engine 315, in conjunction with the database 320, determines whether the input packet can be routed in hardware. A variety of search criteria may be used to determine this, including whether a route already exists for the input packet. In another embodiment, the search engine returns information regarding VLAN support.

The search engine 315 returns the information to the IPP 310. If the information indicated that the header is not to be updated, the header is output via the packet memory 325, OPP 330, and MAC 335 unchanged. Otherwise, the IPP 310 outputs the header from the FIFO and selectively performs on the fly field replacement for predetermined fields of the header. The search engine provides an offset which identifies the location of the time to live (TTL) field in the packet. In addition, for unicast routing, the IPP 310 replaces the destination address (DA) field with a DA supplied by the search engine 315. For example, this can simply be done using multiplexor logic to select either the original value found in the DA field or the DA value received from the search engine 315 based upon a DA replacement control signal issued by the search engine 315. For VLAN support, the IPP 310 selectively replaces or inserts the value in the VLAN tag field.

A counter is preferably used in the IPP 310 to count the bytes output and thus determine which field of the packet is currently being output such that the replacement is timely performed. In addition, it is preferred that the IPP 310 adjusts the time to live (TTL) value in the TTL field and the checksum value in the checksum field of the header. The location of the TTL field is identified by the offset provided by the search engine. The checksum field is immediately following the TTL field. The TTL value output to the packet memory 325 is the TTL value found in the input packet header decremented by one. Similarly, the checksum output is the checksum value from the input packet header decremented by a constant (due to the decrement of the TTL value).

In addition to selectively performing header field replacement, the IPP 310 outputs control field information which is stored in a control field 327 in the packet memory 325. For example, for hardware routing, the control field information consists of an indication (replace_sa) to replace the source address. For VLAN support, the control field information consists of indicators orig_tag, mod_tag and dont_tag. The orig_tag indicator indicates that the packet originally arrived tagged. The mod_tag indicator indicates that the packet originally arrived tagged but it is to be modified. The dont_tag indicator indicates that the packet is not to be tagged.

The packet memory 325 receives the modified input packet from the IPP 310 and the associative field control information. The packet memory functions as a buffer to minimize dropped packets during the movement of packets into and out of the switch.

The OPP 330, retrieves the packet and associated control field information from the packet memory 325 and, in response to the associated control field information, selectively modifies the input packet further as it is output to the MAC 335 and provides control information to the output MAC 335. For example, for hardware routing, the OPP 330 strips the last 4 bytes of the packet containing the CRC and sends control signals to the MAC 335 to insert its address in the SA field and generate a CRC. In one embodiment, the OPP 330 provides instruction to the output MAC 335 by clearing the NO_CRC bit in the MAC control word subsequently sent to the MAC 335 to tell the MAC 335 to append a CRC. CRC generation and insertion is a typical function found in MACs as well as other devices and will not be discussed in detail herein. Furthermore, in one embodiment the OPP 330 further issues a control signal to the MAC 335 to notify the MAC 335 to replace the SA value with its address. Similarly, for VLAN support, the OPP 330 selectively strips the value in the VLAN tag field, selectively strips the CRC from the packet and clears the No_CRC bit in the MAC control word to notify the MAC 335 to append a CRC.

The output MAC 335, responsive to the state of the control signals received, selectively generates a CRC and, inserts its own address in the source address field, completing the header field replacement process. The modified packet is then output from the switch element.

Figure 4A:
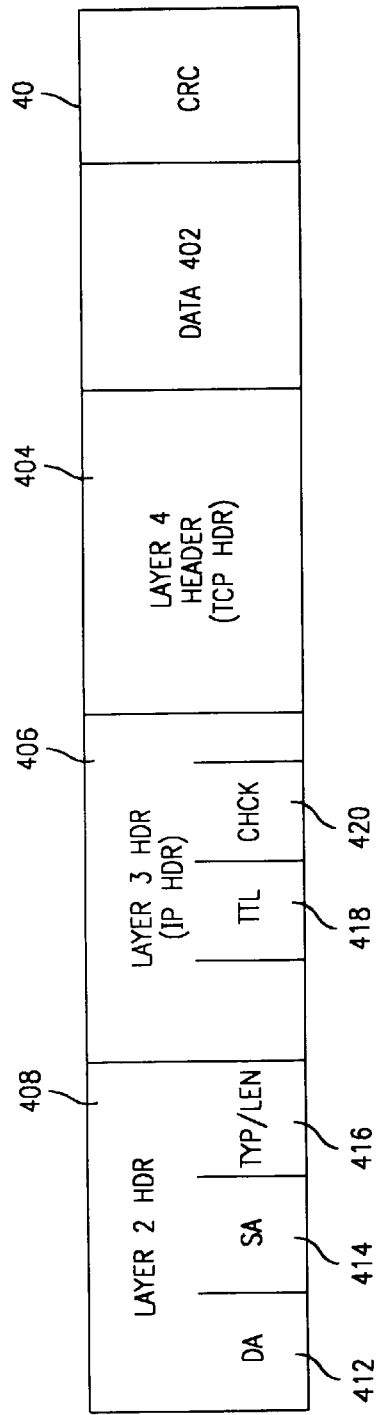
FIG. 4a illustrates a packet format.
Figure 4B:
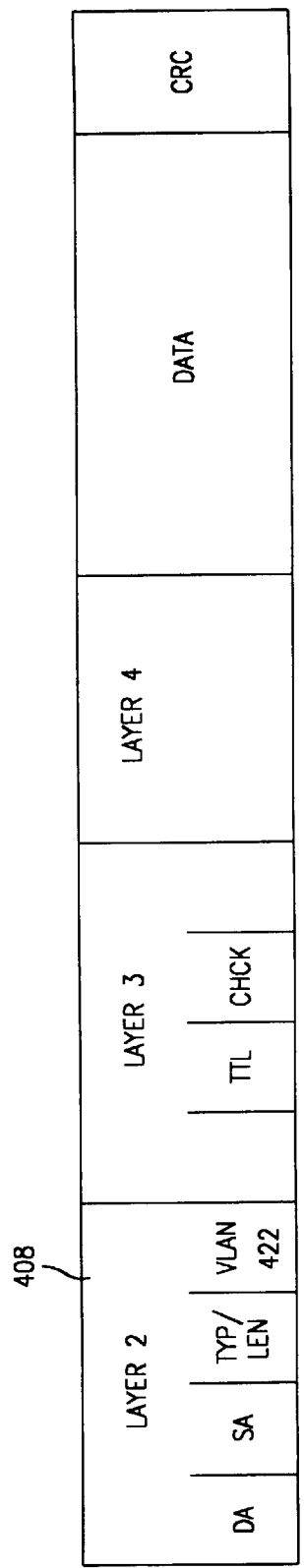
FIG. 4b illustrates a packet format with VLAN support.

FIGS. 4a and 4b are simplified diagrams of two illustrative packet formats that are modified using the system described. FIG. 4a shows a packet consisting of data 402, the Layer 4 header (TCP header) 404, Layer 3 header (IP header) 406, Layer 2 header (data routing or MAC header) 408 and CRC 410. The Layer 2 header includes the DA field, 412, SA field 414, and packet type/length field 416. The Layer 3 header includes the time to live field 418 and the checksum field 420. FIG. 4b illustrates a VLAN supported packet. In this format the Layer 2 header, 408 is modified to include additional 4 bytes 422 that form the VLAN tag.

Figure 5:
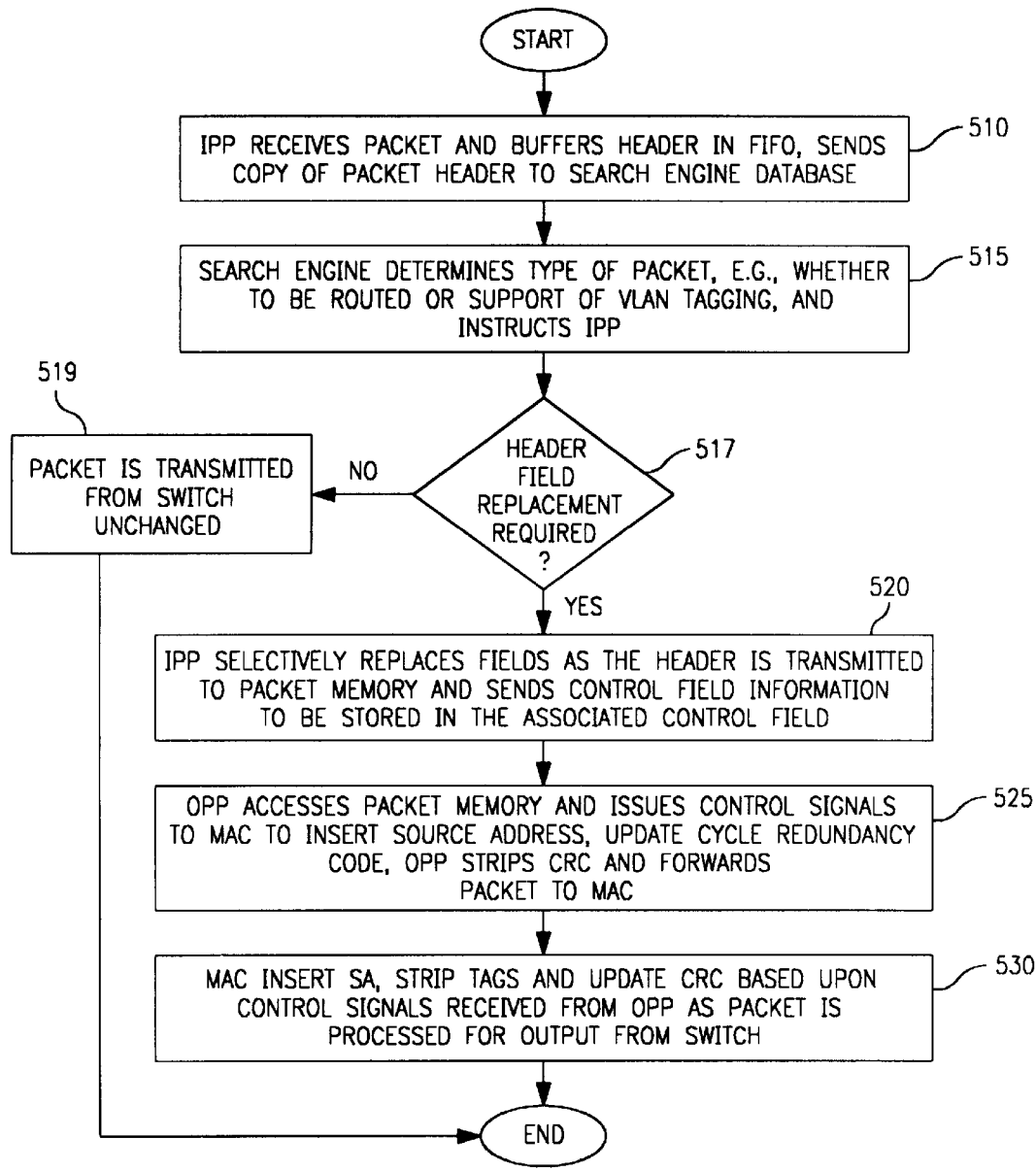
FIG. 5 is a simplified flow diagram of one embodiment of the method of the present invention.

The process performed will now be generally described with reference to FIG. 5. As described earlier, the process is applicable to field replacement, including field replacement required for hardware routing and VLAN support. At step 510, the IPP receives an input packet and buffers the packet in the IPP FIFO. A copy of the header is forwarded to the search engine. At step 515, the search engine searches the database and determines the type of the packet. The type information and certain field replacement values are returned to the IPP. At step 517, if the information supplied by the search engine indicates that the header is not to be modified, the packet is output unchanged from the switch element. Thus, end-to-end error robustness is maintained as the CRC is regenerated only when the header is changed. If header field replacement is needed, at step 520, the IPP selectively performs initial field replacement as the data is transmitted from the FIFO to the packet memory. The fields replaced are replaced with values provided by the search engine and those computed (e.g., TTL, Checksum) in accordance with known techniques. In addition, the IPP forwards certain control field information to be stored in a control field associated with the particular location in the packet memory the modified input packet is stored in.

At step 525, the OPP accesses the packet memory and associated control field information, selectively further modifies the packet and forwards the packet and control information to the MAC. The MAC, at step 530, selectively modifies certain fields of the packet as the packet is output from the switch element.

Figure 6:
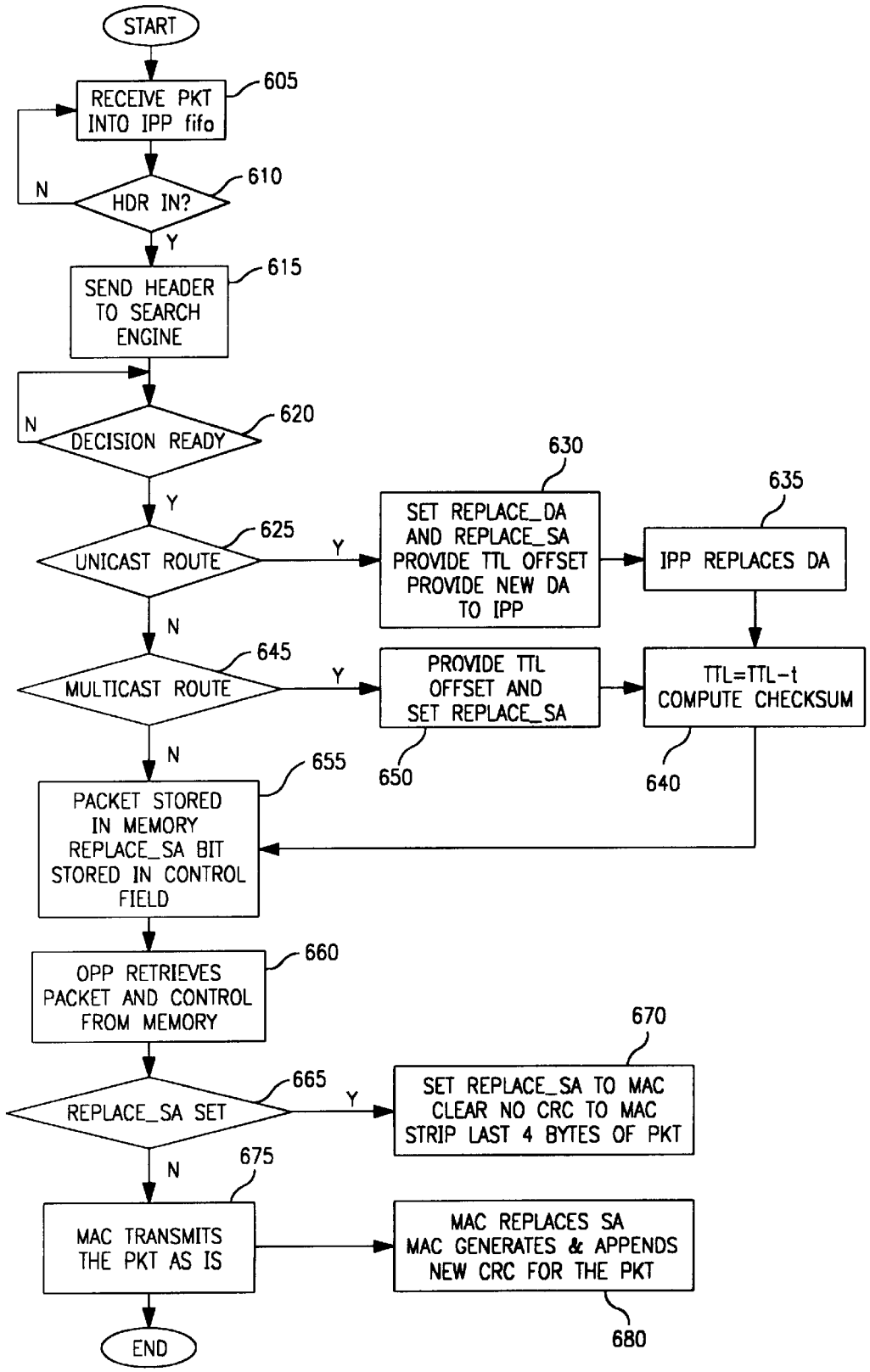
FIGS. 6 is a simplified flow diagram of one embodiment of the method for packet field modification in accordance with the teachings of the present invention.

FIG. 6 illustrates one embodiment of the process that performs header field replacement for input packets that are hardware routed. At step 605, the input packet is received by the IPP and the packet header is stored in the IPP FIFO. As the header is stored in the FIFO, step 610, a copy of the header is forwarded to the search engine, step 615, which searches the database to determine if the packet is to be routed. The IPP then waits for the search engine to return information regarding the packet, step 620. If the search engine determines that the input packet is a unicast route, step 625, the search engine, sends a replace_DA (destination address) control signal and replace_SA (source address) control signal to the IPP, provides the replacement DA and further provides a time to live (TTL) field offset. The IPP, in response to the replace$_{13}$DA control signal, replaces the DA field value with the value received from the search engine computes an updated TTL value and checksum value and replaces the computed values in the corresponding fields as the fields are output to the packet memory. The IPP further responds to the replace_SA signal by inputting corresponding control field information in the packet memory to indicate that the source address is to be replaced with the source address of the output MAC. If at step 645, the search engine indicates that it is a multicast route, the search engine provides the TTL offset and sends a replace_SA signal to the IPP, step 650, and the IPP updates the TTL and checksum values and generates control field information that is stored in the control field associated with the packet memory, step 640.

At step 655, the modified packet output and associated control field information is stored in the packet memory. At step 660, the OPP receives data and control field information from the packet memory and if the OPP detects the replace_SA control field, step 665, the OPP asserts a replace_SA control signal to the output MAC. At step 670, the OPP strips the last 4 bytes of the packet corresponding to the CRC and clears the NO_CRC bit in the MAC control word. At step 680, the MAC detects the replace_SA control signal and replaces bytes 7–12 of the packet with its own MAC address during output packet transmission. Furthermore, in response to the state of the control word, the MAC generates the CRC for the packet. If at step 665, the replace_SA control field information does not indicate replacement, the MAC transmits the packet unmodified, step 675.

Figure 7A:
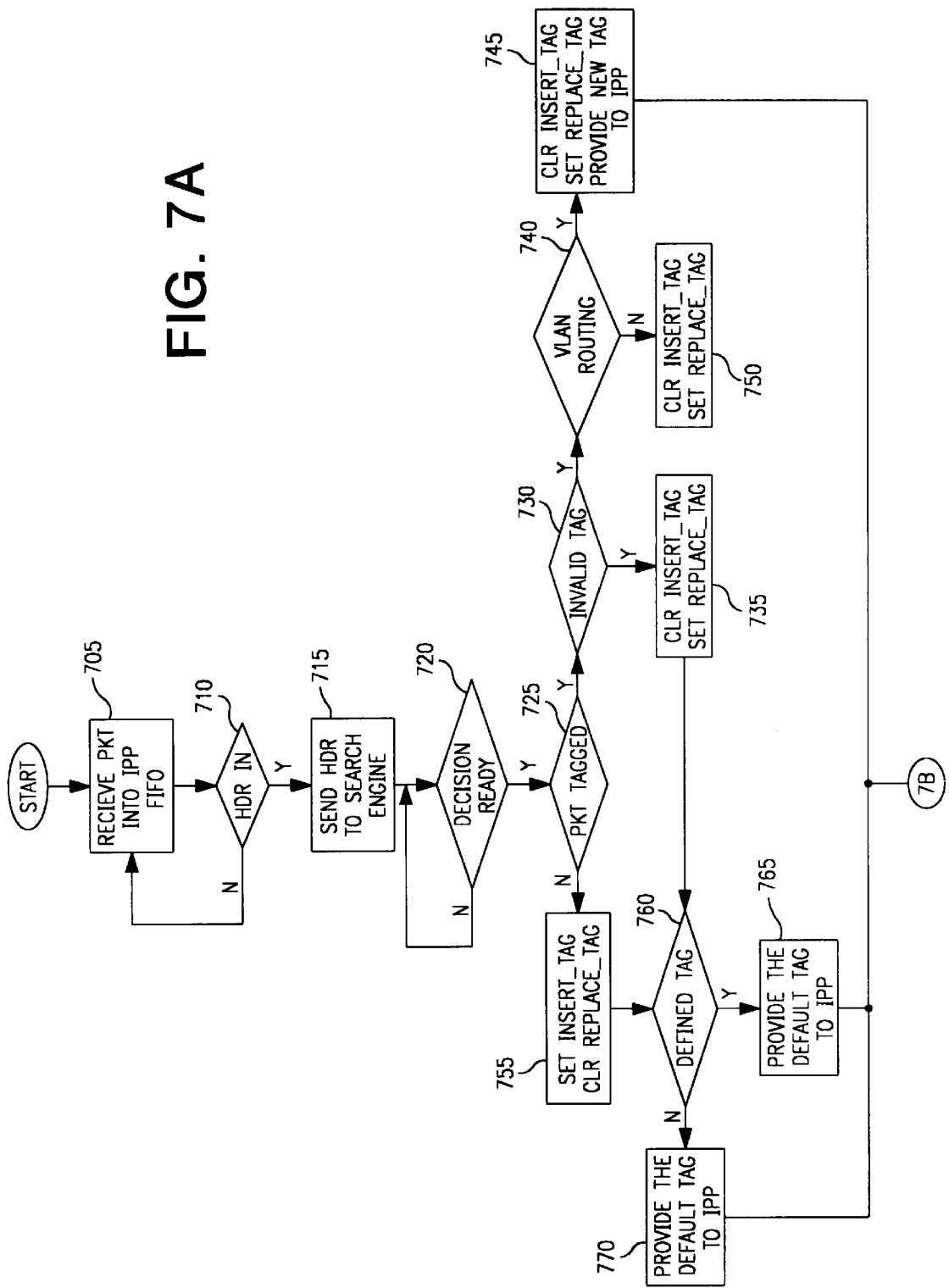
FIGS. 7a and 7b are simplified flow diagrams of another embodiment of the method for packet field modification in accordance with the teachings of the present invention.
Figure 7B:
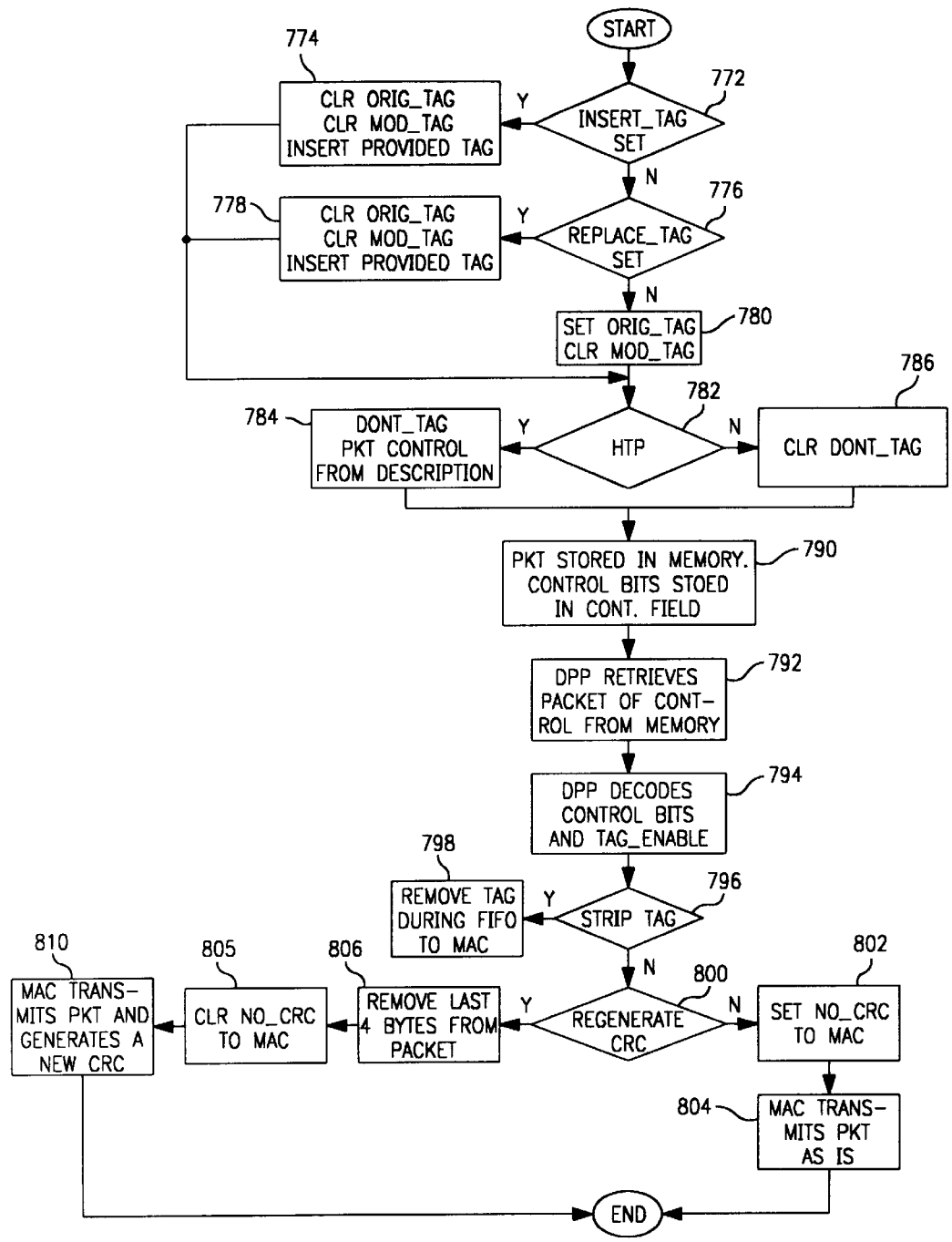

FIGS. 7a and 7b illustrate the process for VLAN support. At steps 705, 710, 715 the IPP receives the input packet, buffers the packet and forwards the header to the search engine. The search engine determines and returns information regarding tagging to the waiting IPP, step 720, regarding whether the packet is tagged, the nature of the tagging and how to tag the packet before it is output from the switch element. A number of possible scenarios exist, including that the packet arrived untagged, the packet arrived tagged valid and the packet arrived tagged invalid. The invalid tag, in certain circumstances, is used to convey only priority information for the packet, rather than VLAN grouping of end nodes.

If, at step 725 the packet is tagged, and the packet is tagged invalid, step 730, control signals are sent to the IPP from the search engine that the insert_tag indicator is to be cleared indicating that no new tag is to be inserted and the replace_tag indicator is to be set, indicating that the tag is to be replaced, step 735. If, at step 730, the packet is tagged valid, and VLAN routing is supported, step 740, at step 745, the insert_tag indicator is cleared, the replace_tag indicator is set and a new VLAN tag representative of the VLAN routing determined by the search engine is provided to the IPP. If at step 740, VLAN routing is not supported, at step 750, signals are sent to the IPP to indicate that the insert_tag is cleared and replace_tag is cleared indicating that a tag is not to be inserted or replaced.

Returning back to step 725, if the packet arrives untagged, at step 755, signals are issued to the IPP indicating that the insert_tag indicator is to be set and the replace_tag indicator is to be cleared. Following the process flow, for the scenarios of untagged packets and packets that are tagged invalid, it is determined whether the tag to be provided by the search engine is one that is defined in the database, step 760. If the tag is defined in the database, the tag is provided to the IPP, step 765. If the tag is not defined in the database, a default tag is provided, step 770. The default tag is a programmable value; typical values follow those specified in current standards.

The IPP, in response to the state of the insert_tag, replace_tag and the VLAN tag value selectively provided by the search engine, will selectively modify the packet header and generate control field information; the modified packet and associated control field information are then respectively stored in the packet memory and associated control fields. At step 772, if the insert_tag indicator was set, at step 774, the following control field information is generated: clear both orig_tag and mod_tag. Orig_tag indicates that the packet has arrived as tagged. Mod_tag indicates that the packet arrived tagged but the tag has been modified. Furthermore, at step 774, the tag provided by the search engine is inserted at the appropriate place in the header by the IPP, preferably as the packet is output to be stored in the packet memory.

Returning back to step 772, if the insert_tag indicator is not set and the replace_tag indicator is set, step 776, at step 778, the IPP replaces the tag in the header with the tag provided by the search engine and generates the following control field information: set orig_tag and set mod_tag, step 780. If at step 776 the replace_tag indicator is not set, the IPP generates the following control field information: set orig_tag, clear mod_tag, at next step 780.

In the present embodiment, the CPU of the network switch can communicate packets through the switch elements. If the packet arrived through this port, the packet may not be tagged regardless of the state of the packet. Thus the indicator dont_tag is provided as control field information to the packet. Referring back to step 782, if the packet arrives through the host transmit process (HTP), dont_tag is set to equal the packet control information provided by the CPU; otherwise, at step 786, dont_tag is cleared.

At step 790, the packet is stored in the packet memory and the control field information is stored in the associated control field. At step 792, the OPP retrieves the packet and control field information and decodes the control field information, step 794. The OPP decodes the three indicators retrieved from the packet memory, orig_tag, mod_tag and dont_tag and a fourth indicator, tag_enable. Tag_enable is an internal variable which indicates that the device that is going to receive the packet to be output does not support VLAN routing. This variable is determined by a network management mechanism based on the underlying network topology. For example, if the receiving node does not support VLAN routing, the tag_enable bit will be cleared. The result of the decoding process indicates whether the OPP is to strip the tag and whether the MAC is to generate a CRC. The OPP decodes according the following table:

| dont_tag | tag_enable | orig_tag | mod_tag | strip tag | regenerate CRC |
|---|---|---|---|---|---|
| 1 | x | 0 | x | Y | N |
| 1 | x | 1 | x | Y | N |
| 0 | 0 | 0 | x | Y | N |
| 0 | 0 | 1 | x | Y | Y |
| 0 | 1 | 0 | x | N | Y |
| 0 | 1 | 1 | 0 | N | N |
| 0 | 1 | 1 | 1 | N | Y |

Thus at step 796, if the tag is to be stripped, the OPP removes the tag, preferably as the tag is transferred to the MAC, step 798. At step 800, if no CRC is to be generated, the OPP sends a signal indicating that no CRC is to be generated (e.g., set no_CRC), step 802, and the MAC transmits the packet as it is received. If the CRC is to be generated, at step 806, the last 4 bytes are removed from the packet by the OPP, a signal to generate the CRC is sent to the MAC, (clear no_CRC), step 808, and at step 810, the MAC transmits the packet and generates the CRC to append to the end of the packet.

The process for field replacement has been described. Other variations are also contemplated. For example, the present switch consists of multiple switch elements wherein packets can be transferred between switch elements. When packets are transferred between switch elements, certain fields are selectively modified.

The invention has been described in conjunction with the preferred embodiment. It is evident that numerous alternatives, modifications, variations and uses will be apparent to those skilled in the art in light of the foregoing description.

What is claimed is:

1. In a packet switch, as apparatus for selective header field replacement comprising:

an input port process (IPP) coupled to receive an input packet comprising a header, data and cyclic redundancy code (CRC), the IPP further comprising a buffer configured to temporarily store the input packet;

a database configured to store information regarding packets and routes;

a search engine coupled between the IPP and the database, the search engine coupled to receive the header and configured to search the database to determine information regarding a type of the input packet;

the IPP further configured to output the input packet from the buffer and to selectively replace at least one field in the header in response to the information provided by the search engine and selectively output control field information to indicate the need for additional modification of the modified input packet prior to output from the packet switch;

an output port process (OPP) configured to receive the selectively modified input packet and the control field information from the IPP, the OPP configured to selectively generate at least one control signal to indicate that the modified input packet is to be further modified prior to output from the packet switch and to output the selectively modified input packet; and an output interface, the output interface coupled to the OPP to receive the at least one control signal and the selectively modified input packet, the output interface configured to output a packet from the packet switch that corresponds to the selectively modified input packet by selectively modifying, in response to the at least one control signal, at least one header field and the CRC prior to transmission of the output packet.

2. The apparatus as set forth in claim 1, wherein the type comprises an indication of whether the input packet is to be routed, wherein if the input packet is to be routed, the search engine is configured to notify the IPP that the input packet is to be routed and the destination address (DA) of a next hop.

3. The apparatus as set forth in claim 2, wherein the IPP is configured to replace a DA field of the header with a DA provided by the search engine if the search engine notifies the IPP that the input packet is to be routed.

4. The apparatus as set forth in claim 2, wherein, the control field information comprises a field set by the IPP to indicate that the source address field of the header is to be replaced prior to output of the modified input packet, the field set when the input packet is to be routed.

5. The apparatus as set forth in claim 2, wherein the at least one control signal comprises control signals to selectively indicate generation of a CRC and a replacement of a source address.

6. The apparatus as set forth in claim 5, wherein the output interface is configured to insert the address of the output interface in a source address field of the header in response to the receipt of the at least one control signal indicating replacement of the source address, and to generate a CRC in response to the at least one control signal indicating regeneration of the CRC.

7. The apparatus as set forth in claim 1, wherein the header comprises a time to live (TTL) field, the IPP further configured to decrement a value in the TTL field by one prior to output.

8. The apparatus as set forth in claim 1, wherein the header comprises a checksum field, the IPP further configured to update a value in the checksum field prior to output.

9. The apparatus as set forth in claim 2, wherein the destination address is replaced when the packet is a unicast packet.

10. The apparatus as set forth in claim 5, wherein the OPP is further configured to strip off the CRC during transmission of the modified input packet to the output interface if the output interface is to generate the CRC.

11. The apparatus as set forth in claim 1, wherein the output interface is a MAC.

12. The apparatus as set forth in claim 11, wherein the at least one control signal comprises a replace_sa signal.

13. The apparatus as set forth in claim 11, wherein the at least one control signal comprises a state of a NO_CRC bit in a control word transmitted to the MAC by the OPP.

14. The apparatus as set forth in claim 1, wherein the switch supports virtual local area networks (VLANs) and the type comprises an indication of whether the input packet is untagged, tagged with a valid tag or tagged with an invalid tag, where:

if the input is untagged, and the search engine is configured to determine that the input packet belongs to a VLAN that has been defined, and to notify the IPP of a VLAN tag of the defined VLAN and at least one indicating that the VLAN tag is to be inserted into a VLAN tag filed of the header;

if the input packet is tagged with an invalid tag, and the search engine is configured to determine that the input packet to a VLAN that has been defined, and to notify the IPP of the VLAN tag of the defined VLAN and at least one indicator indicating that the VLAN tag is to be replaced;

if the input packet is tagged with an valid tag, and the search engine is configured to determine that the input packet should be routed to a different VLAN, and to notify the IPP of the VLAN tag of the different VLAN and at least one indicator indicating that the VLAN tag is to be replaced; and notherwise the search engine is configured to notify the IPP of at least one indicator that indicates no insertion or replacement of the VLAN tag.

15. The apparatus as set forth in claim 14, wherein:

if the VLAN tag is to be inserted, the IPP is configured to insert the VLAN tag provided by the search engine, and generate control field information of a first state;

if the VLAN tag is to be replaced, the IPP is configured to replace the VLAN tag in the input packet header with the VLAN tag provided by the search engine and generate control field information of a second state;

otherwise, the IPP is configured to generate control field information of a third state.

16. The apparatus as set forth in claim 15, wherein the OPP is further configured to selectively remove the VLAN tag field in the modified input packet based on the state of the control field information.

17. The apparatus as set forth in claim 15, wherein the OPP is configured to selectively generate a control signal to regenerate a CRC based on the state of the control field information.

18. The apparatus as set forth in claim 17, wherein the output interface is configured to generate a CRC in response to the at least one control signal indicating regeneration of the CRC.

19. The apparatus as set forth in claim 1, further comprising a packet memory configured to store a selectively modified input packet received from the IPP, the packet memory further configured to store control field information, the OPP coupled to the packet memory and configured to receive the selectively modified input packet and the control field information from the packet memory.

20. A method for selectively performing header field replacement in a network switch device comprising the steps of:

an input port process (IPP) buffering an input packet and providing a copy of a header associated with the input packet to a search engine;

the search engine searching a database to determine a type of the input packet and notifying the IPP of the type of the input packet;

the IPP selectively replacing at least one field in the header in response to the information provided by the search engine and selectively outputting control field information to indicate the need for additional modification of the modified input packet prior to output from the network switch;

an output port process (OPP) reading the modified input packet and corresponding control field information from the IPP, the OPP stripping a cyclic redundancy code (CRC) associated with the input packet and selectively generating at least one control signal to an output interface to indicate that the modified input packet is to be further modified prior to output from the network switch and to output the selectively modified input packet;

the output interface outputting the modified input packet further selectively modified in response to the at least one control signal received from the OPP by selectively modifying at least one header field and regenerating the CRC based upon the modified input packet.

21. The method as set forth in claim 20, further comprising the step of storing the modified input packet and control field information in a packet memory; the OPP further reading the modified input packet and control field information from the packet memory.

22. The method as set forth in claim 20, wherein the type comprises an indication of whether the input packet is to be routed, wherein if the input packet is to be routed, the search engine notifying the IPP that the input packet is to be routed and the destination address (DA) of a next hop.

23. The method as set forth in claim 22, wherein the step of the IPP selectively replacing comprises the step of replacing a DA field of the header with a DA provided by the search engine if the input packet is to be routed.

24. The method as set forth in claim 22, wherein, the control field information comprises a field (replace__SA) set by the IPP to indicate that the source address field of the header is to be replaced prior to output of the modified input packet, the replace__SA set when the input packet is to be routed.

25. The method as set forth in claim 22, wherein the step of generating at least one control signal comprises the step of generating control signals to selectively indicate generation of a CRC and a replacement of a source address.

26. The method as set forth in claim 25, wherein the step of outputting comprises the steps of:
   inserting the address of the output interface in the source address field of the header in response to the receipt of the at least one control signal indicating replacement of the source address; and
   generating a CRC in response to the at least one control signal indicating regeneration of the CRC.

27. The method as set forth in claim 20, wherein the switch supports virtual local area networks (VLANs) and the type comprises an indication of whether the input packet untagged, tagged with a valid tag or tagged with an invalid tag, wherein:
   if the input packet is untagged, and the search engine determines that the input packet belongs to a VLAN that has been defined, the search engine notifying the IPP of a VLAN tag of the defined VLAN, and further issuing at least one indicator indicating that the VLAN tag is to be inserted into a VLAN tag field of the header;
   if the input packet is tagged with an invalid tag, and the search engine determines that the input packet belongs to a VLAN that has been defined, the search engine notifying the IPP of the VLAN tag of the defined VLAN, and further issuing at least one indicator indicating that the VLAN tag is to be replaced;
   if the input packet is tagged with an valid tag, and the search engine determines that the input packet should be routed to a different VLAN, the search engine notifying the IPP of the VLAN tag of the different VLAN, and issuing at least one indicator indicating that the VLAN tag is to be replaced; and
   otherwise the search engine notifying the IPP of at least one indicator that indicates no insertion or replacement of the VLAN tag.

28. The method as set forth in claim 27, wherein:
   if the VLAN tag is to be inserted, the step of the IPP selectively replacing comprising the step of inserting the VLAN tag provided by the search engine, and the step of selectively outputting control field information comprising the step of generating control field information of a first state;
   if the VLAN tag is to be replaced, the step of the IPP selectively replacing comprising the step of replacing the VLAN tag in the input packet header with the VLAN tag provided by the search engine and the step of selectively outputting control field information comprising the step of generating control field information of a second state;
   otherwise, the step of selectively outputting control field information comprising the step of generating control field information of a third state.

29. The method as set forth in claim 28, further comprising the step of the OPP selectively removing the VLAN tag field in the modified input packet based on the state of the control field information.

30. The method as set forth in claim 28, wherein the step of selectively generating at least one control signal comprises a control signal to regenerate a CRC based on the state of the control field information.

31. The method as set forth in claim 30, wherein the output interface further selectively modifies the modified input packet by generating a CRC in response to the at least one control signal indicating regeneration of the CRC.

32. In a packet switch, an apparatus for selective header field replacement comprising:
   a switch element including an input port process (IPP), a database, a search engine, an output port process (OPP), and a media access controller (MAC), the IPP coupled to the MAC and the search engine the IPP receiving from the MAC header information associated with an input packet comprising a header, data and a cyclic redundancy code (CRC), the database configured to store information to facilitate forwarding and filtering of packets, the search engine coupled to the database and coupled to receive a copy of the header from the IPP, the search engine configured to search the database to determine and supply information regarding a type of the input packet and information regarding the input packet'next hop to the IPP which is configured to selectively replace at least one field in the header responsive to the type and to selectively output control field information to the OPP to indicate the need for additional modification of the input packet prior to output from the packet switch;
   if the type determined by the search engine indicates that the header does not change, the input packet is output from the packet switch without modification thereby preserving end-to-end error robustness;
   if the information determined by the search engine indicates that at least one portion of the header changes, the header of the input packet is updated by the IPP, the CRC is stripped by the OPP and regenerated by the MAC based upon the updated packet and the updated packet is output from the packet switch.

33. In a packet switch, an apparatus for selective header field replacement comprising:
   an input port process (IPP) configured to receive a packet comprising a header, data and cyclic redundancy code (CRC) and configured to selectively replace at least one field in the header in response to information regarding a type of packet and selectively output control field information to indicate additional modification of the packet prior to output from the switch;
   an output port process (OPP), coupled to the IPP, configured to receive the packet and the control field information, the OPP configured to selectively generate at least one control signal to indicate that the packet is to be further modified prior to output from the switch and to output the packet; and a media access controller (MAC) coupled to receive the at least one control signal and the packet, the MAC configured to transmit an output packet corresponding to the selectively modified packet, in response to the at least one control signal, the MAC further configured to selectively modify at least one header field and the CRC prior to transmission of the output packet.

* * * * *